Feb. 2, 1926.                                                  1,571,805
                         F. B. SAMUEL
                      FRACTIONATING TOWER
                    Filed April 17, 1924           3 Sheets-Sheet 1
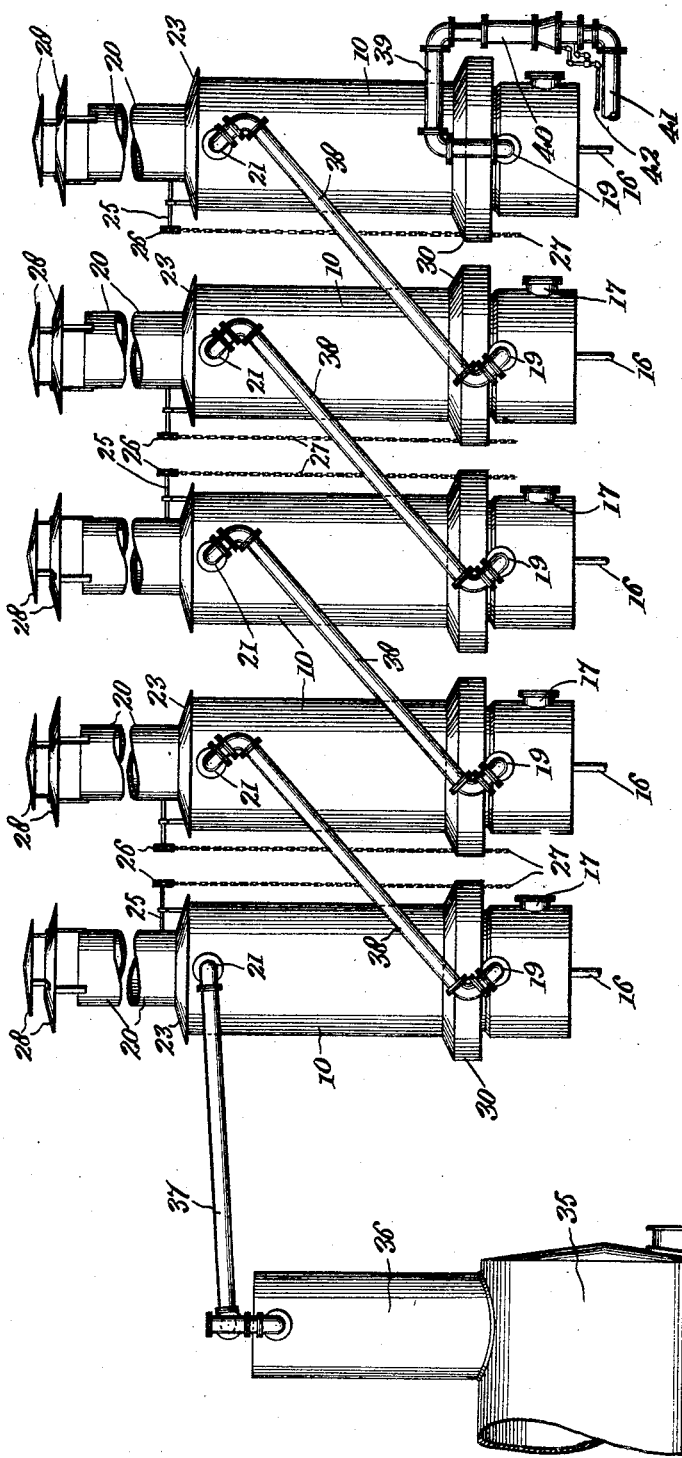

Feb. 2, 1926.  1,571,805
F. B. SAMUEL
FRACTIONATING TOWER
Filed April 17, 1924   3 Sheets-Sheet 2
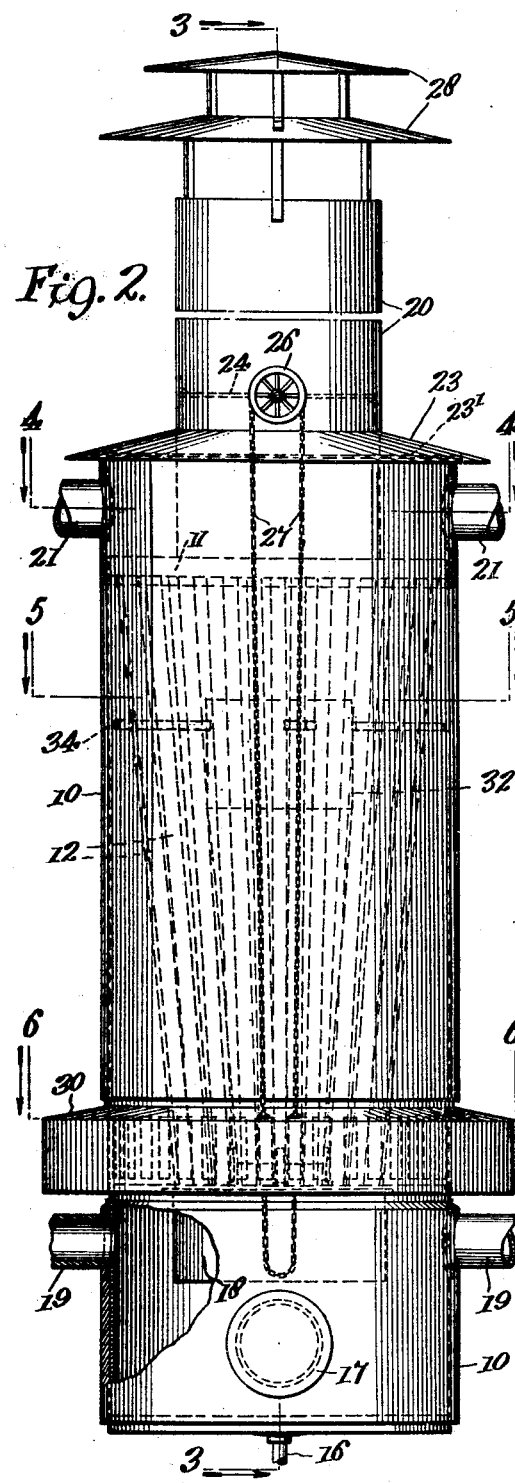
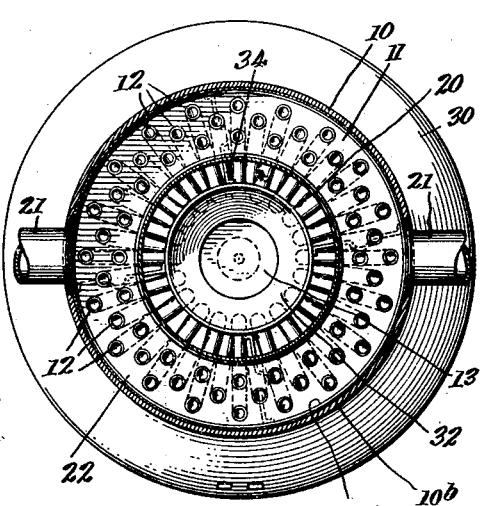
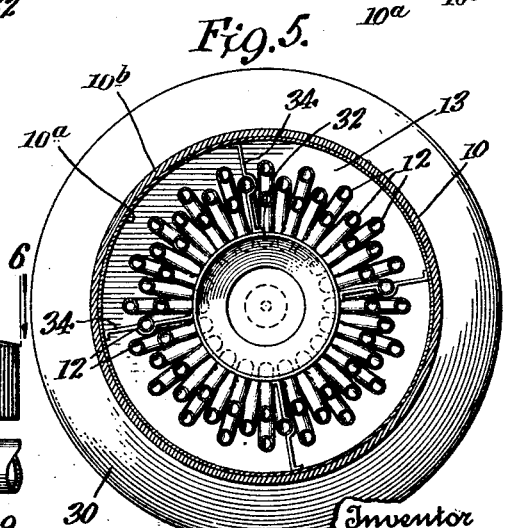
Inventor
F. B. Samuel
by Wilkinson & Giusta
Attorneys.

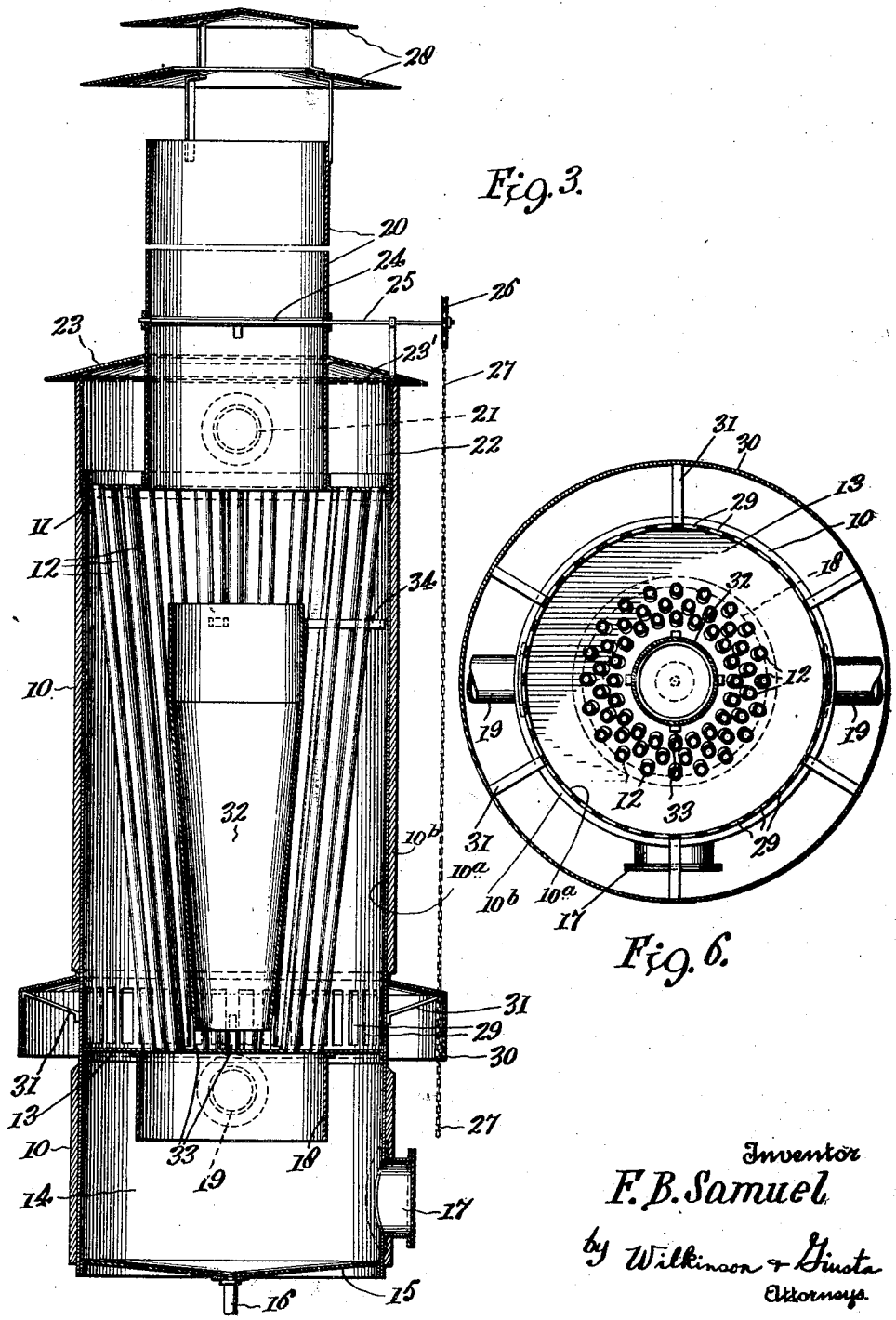

Patented Feb. 2, 1926.

1,571,805

UNITED STATES PATENT OFFICE.

FRANK BERNETTE SAMUEL, OF BATON ROUGE, LOUISIANA.

FRACTIONATING TOWER.

Application filed April 17, 1924. Serial No. 707,193.

*To all whom it may concern:*

Be it known that I, FRANK BERNETTE SAMUEL, a citizen of the United States, residing at Baton Rouge, parish of East Baton Rouge, and State of Louisiana, have invented certain new and useful Improvements in Fractionating Towers; and I do hereby declare the following to be a full, clear, and exact description of the invention, such as will enable others skilled in the art to which it appertains to make and use the same.

The present invention relates to an improved condensing and fractionating tower for use in treating oil vapors as well as for use in treating any and all other vapors to which the fractionating process may be applied.

An object of this invention is to provide a tower permitting the slow cooling, by air and partial condensation, of oil vapors during their passage from the still to the condenser, and a tower which may be used as an intermediate cooling, fractionating and partial condensing device for the vapors so that when the vapors are delivered to the final condenser complete condensation may take place.

Another object is to provide a tower which may serve as an intermediate device, either singly or in multiple, of the above character and which allows the separate fractions of the vapor to condense out with the heavier fractions condensing first, and then the lighter ones following, the lightest fractions being allowed to pass to the light product condensing worm, and the heavy and intermediate products may be run back to the still or to cooling coils or to such point as desired by the refiner.

A further object is to provide a tower or series of towers wherein the vapors may traverse a long path with a slow temperature drop to insure that the condensation products become more uniform in character, and may be more readily separated.

A still further object of the invention is to provide a tower which may be arranged in series with a number of like towers between the still and final condenser, and which when so arranged allows each tower to retain only its own condensate and not be contaminated with any of that entrained from a preceding tower and which insures from tower to tower and to the final condenser. The nature of this condensate may then be predetermined and obtained by means of draft control.

Another object is to provide a tower which when arranged in series with other similar towers makes it possible to remove from the mixed vapors several simultaneous cuts or fractions, each cut in itself being a perfectly separated fraction. The fractionating efficiency of the tower being such, rerunning of these products becomes unnecessary.

A further object is to provide a tower, serving either singly or in multiple, whose cooling effect can be so controlled that only the fraction or fractions desired will be condensed, and only those fractions returned to the still that will be improved by further distillation. In the case of an oil vapor, only the heavy fractions will be returned to the still in order that they may be later partly cracked by the high temperatures found near the end of the run with the formation of lighter fractions of a lower gravity.

A further object of the invention is to provide a tower which effects maximum efficiency of fractional condensation without the aid of reflux action or refractionation (with stones or the like), the tower acting strictly as a fractional condenser. The condensate formed is removed from the condensing zones as quickly as possible.

A further object is to provide a tower which may serve either singly or in multiple wherein the fractionating efficiency of the towers and the fuel consumption of the still, because of said towers, remains constant regardless of the varying weather conditions and seasonal changes.

Another object of the invention is to provide a tower which when arranged singly or in multiple has the tendency to keep all of its tube condensing surfaces clean by the scouring effect of the vapors, as they sweep downward in the tubes carrying with them the forming condensate. The tendency of the condensate then to form contaminating deposits on the condensing tube surfaces, as experienced in towers using reflux where there is a partial suspension of the condensate in the refluxing tubes, is then avoided.

A still further object of the invention is to provide a tower in which the products of condensation are uniform in character, is exposed to the exact same conditions of cooling so as to make each tube produce a condensate of exact same character as any other tube within the same tower.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a portion of a condensing and fractionating plant disclosing a series of towers constructed according to the present invention.

Figure 2 is an enlarged side elevation of a tower constructed according to the present invention, the view being taken at right angles to the showing in Figure 1 and parts being broken away to disclose the interior structure.

Figure 3 is a vertical section taken axially through the tower substantially on the line 3—3 of Figure 2.

Figure 4 is a transverse section taken through the tower near its upper end, substantially on the line 4—4 of Figure 2.

Figure 5 is a similar view taken below the section of Figure 4 and substantially on the line 5—5 of Figure 2, and Figure 6 is a transverse section through the lower end of the tower taken substantially on the line 6—6 of Figure 2.

Referring to the drawings the tower comprises a body portion or casing 10, the outer wall of which may be of composite structure including a metal shell $10^a$ and an outer coating of insulation or the like $10^b$, and the body 10 is of suitable height to provide the necessary vertical distance for carrying out the objects and advantages of the tower. The tower 10 is provided at its upper end with a horizontal partition 11 which constitutes a header for a plurality of tubes 12 which are arranged in upright position within the tower, but which converge toward their lower ends and are secured in a lower partition or header 13 which is secured in the tower 10 in spaced relation from the lower end thereof. The lower end of the tower 10, beneath the header 13 comprises an expansion chamber 14 and a condensate trap. The tower has an inclined bottom 15 forming the lower end of the chamber 14 and upon which may be collected the condensate for carrying the same off through a drain pipe 16 which opens through the lowermost portion of the bottom 15. The tower 10 may have a manhole 17 at one side of the expansion chamber 14 for the purpose of gaining access to the interior and bottom of the tower when necessary.

The lower header 13 is provided with a depending circular baffle 18 which surrounds the lower ends of the pipes 12 and which extends down to a point past the vapor outlet pipes 19 and which insures the circulation of the downwardly flowing vapor from the pipes 12 through the condensate trap or expansion chamber 14 to the point past the vapor outlets so that the vapor has to revert back, thereby reversing its direction of flow, with the result that the entrained condensate becomes thrown, or literally snapped out of the vapor before the vapor is permitted to exhaust through the outlet pipes 19 which are connected through one or more sides of the expansion chamber 14 and above the lower edge of the baffle 18 and also well above the bottom of the expansion chamber 14, being located close to the lower header 13.

The upper header 11 carries an upper stack section or flue 20 which is of less diameter than the tower body 10, and which lies within the area of the upper ends of the pipes or tubes 12, and which forms with the outer wall an annular chamber 22 opening downwardly through the tubes 12. The tower 10 is provided in one or more sides with inlet pipes 21 which open into the annular chamber 22 for admission of vapor to the chamber, and for the uniform distribution of the vapor to the downwardly extending tubes 12. The tower 10 is provided with a cover 23 in the form of a ring which is substantially of frusto-conical form and fitted about the flue 20 and projecting over the side wall or body 10 of the tower. This cover 23 is spaced above a top plate 23′ which closes the top of the chamber 22 so that the vapor cannot rise, and therefore descends through the tubes 12. The cover plate 23 is used and spaced above the top plate or plates 23′ to prevent damage and leakage to the top plate 23′ such as by rain and the like striking the hot top plate 23′ which is likely to cause undue straining thereof. The flue 20 is provided with an insulated damper 24 of suitable construction mounted upon a shaft 25 carrying a grooved wheel 26 over which is trained an operating chain 27 depending at the side of the tower, and the lower end of which is in position of easy access of the operator or attendant for regulating the position of the damper 24. The damper chain 27 may also be actuated by an automatic temperature control regulator so as to bring the operating tower efficiency down to a fine point. The flue or upper stack 20 is open at its top and is protected by a series of covers or deflectors 28 for shedding rain and the like and for promoting an up-draft through the flue 20.

The tower 10 is provided, immediately above the lower header 13 with an annular row of spaced apart air slots or ports 29 of suitable height for admitting air in the desired quantity to the interior of the tower above the header and about the lower ends of the tubes 12. The tower 10 is also provided with an annular hood or rain guard 30, which is secured to the outer wall of the tower above the slots 29, and which extends outwardly from the tower and is supported upon radial braces 31 to provide sufficient space for access of air to the slots 29, the skirt of the hood 30 depending sufficiently to cover the slots 29 and ward off rain and the like liable to enter the slots 29.

A central deflector 32 is mounted in the tower 10 and supported by lower braces 33 and upper braces 34 in an intermediate position between the headers 11 and 13, and preferably near the lower header 13. The central deflector 32 is slightly raised from the bottom header 13 in order to induce a partial central draft. This small central draft causes the inlet cooling air to be drawn in more closely about the foot of the tubes 12 before passing upward. A greater portion of the tube cooling area is thereby made effective. The deflector 32 is of inverted frusto-conical form and substantially follows the inclination of the tubes 12, so as to divert the inflowing air toward and about the tubes for the major portion of their length.

The deflector 32 is spaced at its upper end from the upper header 11 and the said upper header 11 is provided with a central opening which registers with the flue 20 so that the air after passing upwardly about the tubes 12 may then pass upwardly and out through the flue 20. By this arrangement the tubes 12 are subjected to uniform cooling around the entire circumference of the tower by the upward circulation of the air through the tower.

In the operation of the tower the oil vapor is admitted to the tower through the inlet pipe 21 and into the annular chamber 22 from which the vapor is distributed to the upper ends of the tubes 12. The vapor then passes downwardly through the tubes 12 into the expansion chamber or condensate trap 14 and within the area determined by the circular baffle 18. The condensate which is carried downwardly through the tubes 12 with the vapor falls within the expansion chamber and is collected upon the inclined bottom 15 and drained off through the pipe 16. It is important that the pipe 16 be of sufficient diameter to quickly carry off the accumulated condensate in order to prevent the undue heating of the expansion chamber 14 and further to reduce to a minimum the tendency of the condensate to form contaminating deposits on the tower bottom by remaining at this high temperature. The vapor then circulates about the lower end of the circular baffle 18 and passes upward thereby reversing its direction of flow. The condensate is hence thrown or literally snapped out of the vapor by this sudden change of direction of the vapor flow. On reaching the outlet pipes 19 the vapor then passes outwardly in a dry, or condensate free state to the next fractionating body or to the condenser, depending on the location of the tower in the series.

For cooling and condensing the vapor as it passes downwardly through the tubes 12 air is admitted beneath the hood 30 and through the slots 29. The air thus blows directly and uniformly against the lower ends of the pipes 12 around the entire circumference of the tower and is thence distributed upwardly about the pipes by the central deflector 32 and fills the outer annular portion of the tower 10 so as to cool the pipes or tubes 12 throughout their lengths. The air finally passes upwardly through the central portion of the header 11 and into the flue 20 where it is exhausted through the top of the tower. The height of this flue or stack is determined by the amount of draft required to give the necessary temperature drop to the vapor to condense the particular fraction sought from that tower. The intensity of this cooling draft is governed directly by an insulated damper 24 which controls the amount of cooling air permitted to be passed up through the tower. The damper 24 is to be actuated preferably by an automatic temperature control regulator. With such a device together with the insulation about the tower body 10 the amount of cooling desired of each tower can definitely be maintained regardless of weather conditions or seasonal changes.

As shown in Figure 1, it is preferable to use a plurality of the towers 10 in series and between a still 35 and the final condenser, not shown. The still 35 is shown diagrammatically and provided with a dome 36 from which leads one or more pipes 37 connected to the inlet pipes 21 at the upper end of the first of the towers 10. The outlet pipes 19 near the lower ends of the towers 10 are connected by pipes 38 with the inlet pipes 21 of the next tower 10, the pipes 38 being inclined upwardly from the bottom of one tower to the top of the adjacent tower. In this manner a plurality of towers 10 are connected in series by the pipes 38 as shown. Each tower 10 is provided with a condensate drain 16, at its bottom so that the condensate may be withdrawn at each stage throughout the series. This condensate may be returned to the still or cooling worms or to such points as the refiner desires. The last tower 10 of the series may have its outlet pipe 19 connected by a pipe 39 to a vapor separator 40 or other suitable device for further separating the vapor contents. This separator, however, is only necessary in the event of the case wherein the tower is desired to be driven at a greater rate than that provided originally in the tower design. In such a case the separating efficiency of the tower condensate trap becomes lowered and increased separating capacity is then required to render the same effective separation. The separator has an outlet pipe 41 for the lighter vapor, and a take off pipe 42 for the heavier entrained condensate particles which are delivered from the separator 40 and which are then united with the similar condensate from drain 16 in the final tower.

It is apparent from this construction that each tower is provided with a vapor inlet at its upper end and an outlet at its lower end, and a plurality of passages or flues, in the form of the tubes 12 in the present instance, between the inlet and outlet ports through which the vapor is divided into separate streams, and has the means for admitting and drawing a current of air uniformly inward around the circumference of the tower and passing same upwardly through the tower about the separate flues or passages for cooling the vapor and means for carrying off the air from the top of the tower after the pipes have been cooled and means for controlling the amount of air permitted to be passed in through the tower.

It will be noticed in the foregoing objects, description and appended claims that the vapor flow is downward through the successive towers in the series. This downward flow is unlike that used in air cooled fractionating towers in general. In the upward flow types of fractionating tower the condensate formed in the tubes refluxes back and, hence, passes in opposite direction to the vapor flow. In the down flow type the condensate and vapor pass in the same direction.

The refluxing found in upward flow, air cooled oil vapor fractioning towers has been found to be a decided disadvantage instead of an asset, since the condensate formed is always of a darker color and higher gravity than the resultant vapor would be on being condensed. The vapors then due to their high velocity sweep part of this condensate over into the next fractionating body or to the receiving house. This, therefore imparts to the fractions formed in these bodies a darker color and higher gravity, or in other words, a poor separation of the fractions is effected in them. Further, it has been found that refluxing causes deposits to be formed on the condensing surface, since the condensate is held to some extent in the condensing tubes in partial suspension, therefore, affording excellent conditions under which these deposits may be formed. The deposits are partly the cause of the bad odor found in poorly fractioned light products. The presence of these deposits results in increased refining expense in that considerable sweetening is required. Again, heavy refluxing sets up a back pressure on the still. This causes excessive blowing of the safety valve. This blowing is dangerous and a loss. Further, to reduce it the fires must be slacked which, therefore, incurs a time loss. Lastly it is found that when using reflux action even if the distillation is slow and no entrainment exists, that the condensate found is of no better quality than that formed in a tower not using the reflux principle, but which obtains its objects by a slow and uniform temperature drop, the tower being strictly a fractional condenser.

In the downward flow type of tower, on the other hand, quite a different set of conditions exist: No condensate is entrained from the tower though the vapor velocity may be extremely high, since the vapor flow is downward and no refluxing exists. The condensate formed in the condensing tubes passes downward with the vapor and is snapped out of the vapor in the condensate trap as the vapor reverses its direction of flow to escape from the tower. Nothing, therefore, but an absolute dry or condensate free vapor passes on to the next condensing body or to the receiving house. Further, the downward sweeping action of the vapors tends to scour the condensing tubes, thereby keeping them clean and eliminating, therefore, the tendency of condensate to form the contaminating odor giving deposits. The downward vapor flow further reduces the pressure in the still, allowing the still, therefore, to be driven harder without danger of blowing and consequently allowing a short time for a run.

At first thought it might be reasoned that by passing the vapor down in the towers instead of up that one was opposing the tendency of the vapors to rise. On further reasoning, it will be seen, however, that when the vapors are passed up through a tower they have to pass down the same distance through a connecting passage in order to enter the next tower. Hence, there is no difference in pressure whether it passes up through a tower or down, since it must pass down the same distance it goes up in both cases. However, by passing the vapor down through the tower, the vapor does not have to buck the falling condensate, as experienced in the up flow method. This pressure amounts to several pounds in the first tower. A further advantage of the downward flow tower is that the vapor and cooling air pass in opposite directions. Counter current cooling with the resultant maximum efficiency of heat exchange is therefore effected.

It will be further noted that the individual towers are insulated with a standard insulation. Air cooled fractionating towers in general do not employ any insulating medium; hence, their performance is very erratic. Due to weather conditions and seasonal changes the fractionating efficiency of the tower becomes quite unreliable and the fuel requirements are found to vary as much as 40 per cent together with a time loss due to slower distillation incurred. The general type of air cooled fractionating towers are not so designed that an insulating medium can be profitably employed. The usual draft facilities are limited and the greater part of the cooling is intended to be done by direct radiation through the outer shell of the tower. If this type were, therefore, insulated more towers would be required to accomplish the same cooling; so that the application of the insulation then becomes uneconomic. The tower described herein is, however, particularly suited to insulation, since the vapor passes downward and the cooling air up, counter current cooling with its maximum efficiency of heat exchange is thereby effected with the result that a minimum amount of cooling air is required to obtain the necessary temperature drop. The draft may be made sufficient for the requirements by increasing the stack height. No cooling by radiation from the tower body is then necessary, since all air for cooling under maximum conditions of draft requirement can be taken through the ports provided. This draft is controlled by a damper and can be regulated by temperature control regulators. The fractionating efficiency of the tower then becomes independent of weather conditions and seasonal changes. A uniform fuel consumption is the net result. The warmer the weather the wider the damper is opened and the colder the weather the smaller the opening allowed. By this efficient temperature control and by the use of insulation enormous fuel saving is effected. On cold or rainy days the amount of run back from an exposed tower becomes excessive. Excessive run back represents a fuel loss, for it requires additional fuel to send the vapors back into the towers. By insulating, only the theoretically necessary amount of run back need be returned to the still. The amount of this can be determined and obtained by automatic temperature control.

The tower expansion chamber or condensate trap is designed to provide maximum efficiency of separation of the vapor and condensate under normal running conditions of the still. The occasion might arise, however, when the still, either through inattention on the part of the operator, or for special reasons is driven faster than the rated capacity of the tower condensate trap. This forcing of the tower it will be seen causes an increase of gravity of the vapor finally discharged, since some entrainment exists. The separator, therefore, is installed to eliminate this condensate and insure that only dry or condensate free vapor passes to the final condenser. The height of the stack on the tower has also been made of a slightly greater height than that required for normal running conditions in order to provide the necessary draft to cause sufficient cooling of the vapor when the tower is subjected to an overload. The purpose of this is to insure for the tower a perfect performance under adverse conditions.

It is obvious that various changes and modifications may be made in the details of construction and design of the above specifically described embodiment of this invention without departing from the spirit thereof, such changes and modifications being restricted only by the scope of the following claims.

What is claimed is:—

1. In a fractionating tower, a vertical, insulated, non-heat radiating body portion having depending flues therein, means for directing vapor into the upper ends of said flues, means for collecting condensate from the lower ends of the flues, means for carrying off the resultant vapor in a dry or condensate free state from the lower ends of the flues, means for directing an induced draft of air uniformly upward about said flues for their entire length for cooling and condensing part of the vapor therein, means for preventing loss of heat by radiation through the outer body surface of the tower, and means for varying or maintaining any desired temperature drop within the tower irrespective of weather conditions, or seasonal changes.

2. In a fractionating tower, a vertical insulated non-heat radiating cylindrical body, spaced headers arranged within the body, a plurality of flues flaring upwardly and secured in an annular area through the upper header and having their lower ends secured through the lower header in a central restricted area thereof, means for supplying an oil vapor to the upper ends of the flues, means for directing a draft of air against the lower ends of the flues around the entire circumference of the tower, a deflector arranged between the flues for directing the uniformly admitted current of air upwardly along the flues throughout their entire length, means for collecting the condensate beneath the lower header, and means for carrying off the remaining vapor issuing from the lower ends of said flues in a dry or condensate free state.

3. In a fractionating tower, a vertical insulated non-heat radiating cylindrical body, spaced headers arranged in the body, an outlet flue or stack carried by the upper header and extending through the top of the cylindrical body for carrying off a current of air from beneath the upper header, said body having lateral openings around the entire circumference of the lower body immediately above the lower header for uniform ingress of air to the interior of the body, a plurality of flues arranged in circular order within the cylindrical body and secured at opposite ends through the upper and lower headers and with the lower ends of the flues disposed in a restricted central area of the lower header, a circular baffle depending from the lower header and adapted to direct vapors downwardly from the ends of the flues and then reverse their direction of flow so as to deposit the condensate in the bottom of the tower, and a central deflector arranged within the group of flues for directing the current of air upwardly and about said flues for their entire length.

4. In a fractionating tower, a vertical insulated body portion, spaced headers in the body portion providing a vapor receiving chamber at the upper end of the tower and an expansion chamber or condensate trap at the lower end of the tower, tubes arranged vertically in the tower and secured at their ends in said head for dividing the down flow of vapor into a plurality of separate streams, said tower having a plurality of slots in its side and immediately above the lower header for admitting air to the interior of the tower about said tubes, an annular hood secured about the tower and overhanging said slots for deflecting rain and the like therefrom, a flue opening through the central portion of the upper header and projecting upwardly through the tower for carrying off air from between the headers, a damper located in said flue for controlling volume of incoming cooling air, a circular deflector arranged between the tubes for deflecting the air against and about the tubes to insure the complete surface contact of the tubes with the upflowing air current.

FRANK BERNETTE SAMUEL.